United States Patent
Kim et al.

(10) Patent No.: US 8,776,669 B2
(45) Date of Patent: Jul. 15, 2014

(54) ANTI-ABRASION DEVICE AND RECIPROCATING COMPRESSOR HAVING THE SAME

(75) Inventors: Jin-Kook Kim, Gyeongsangnam-Do (KR); Kyeong-Ho Kim, Gyeongsangnam-Do (KR); Young-Hwan Kim, Gyeongsangnam-Do (KR); Kyoung-Jun Park, Gyeongsangnam-Do (KR); Jong-Mok Lee, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 882 days.

(21) Appl. No.: 12/997,985

(22) PCT Filed: Jul. 17, 2009

(86) PCT No.: PCT/KR2009/003952
§ 371 (c)(1),
(2), (4) Date: Dec. 14, 2010

(87) PCT Pub. No.: WO2011/007911
PCT Pub. Date: Jan. 20, 2011

(65) Prior Publication Data
US 2011/0232416 A1  Sep. 29, 2011

(51) Int. Cl.
F04B 53/14 (2006.01)
F16C 33/08 (2006.01)
F16C 9/04 (2006.01)
F16C 7/02 (2006.01)

(52) U.S. Cl.
CPC ........... F04B 53/147 (2013.01); *F16C 2362/52* (2013.01); *F16C 2240/40* (2013.01); F16C 33/08 (2013.01); F16C 9/04 (2013.01); F16C 7/02 (2013.01)
USPC .......................................................... 92/140

(58) Field of Classification Search
CPC ................ F01B 9/00; F01B 9/02; F04B 9/02; F04B 9/025; F04B 39/0094; F04B 53/147; F16C 9/04; F16C 9/06; F16C 7/02
USPC ...................................................... 92/128, 140
See application file for complete search history.

(56) References Cited

U.S. PATENT DOCUMENTS

| 6,948,418 | B2 * | 9/2005 | Kim ................................. 92/140 |
| 6,976,559 | B2 * | 12/2005 | Iversen et al. ................ 184/6.16 |
| 6,997,101 | B2 * | 2/2006 | Lyu ................................ 92/140 |
| 7,024,960 | B2 * | 4/2006 | Seo ............................. 74/579 E |

(Continued)

FOREIGN PATENT DOCUMENTS

| CN | 1538064 A | 10/2004 |
| CN | 101090800 A | 12/2007 |

(Continued)

*Primary Examiner* — Thomas E Lazo
(74) *Attorney, Agent, or Firm* — McKenna Long & Aldridge LLP

(57) ABSTRACT

Disclosed are an anti-abrasion device and a reciprocating compressor having the same, whereby a sleeve is fabricated with an outer diameter smaller than an inner diameter of a connecting rod to be non-press-fitted, thereby facilitating an assembly of the sleeve, and also the deformation of an inner diameter of the sleeve is prevented during the assembly of the sleeve, thereby preventing beforehand an increase in an input load of a motor unit due to the deformation of the sleeve and an abrasion of a pin of a crankshaft.

17 Claims, 6 Drawing Sheets

(56) References Cited

U.S. PATENT DOCUMENTS

| | | | |
|---|---|---|---|
| 7,051,644 B2* | 5/2006 | Park | 92/187 |
| 7,225,723 B2* | 6/2007 | Yoon | 92/140 |
| 2003/0075007 A1 | 4/2003 | Seo | |
| 2004/0025685 A1* | 2/2004 | Park | 92/140 |

FOREIGN PATENT DOCUMENTS

| | | |
|---|---|---|
| DE | 31 13447 A1 | 10/1982 |
| DE | 10 2006 020 795 A1 | 11/2007 |
| DE | 102006020795 A1 * | 11/2007 |
| FR | 1279473 | 4/1902 |
| JP | 2001-304111 A | 10/2001 |
| JP | 2003-120533 A | 4/2003 |
| KR | 20-0382921 Y1 | 4/2005 |
| WO | WO 2009/051371 A2 | 4/2009 |
| WO | WO 2009051371 A2 * | 4/2009 |

\* cited by examiner

ANTI-ABRASION DEVICE AND RECIPROCATING COMPRESSOR HAVING THE SAME

This application is a 35 U.S.C. §371 National Stage entry of International Application No. PCT/KR2009/003952 filed on Jul. 17, 2009, the contents of which are hereby incorporated by reference herein in their entirety.

TECHNICAL FIELD

The present invention relates to a reciprocating compressor, and more particularly, a sleeve disposed between a connecting rod and a crankshaft in a reciprocating compressor in which a piston is connected to the crankshaft, performing a rotary motion, via the connecting rod so as to perform a reciprocating motion.

BACKGROUND ART

In general, a hermetic compressor is a compressor provided with a motor unit disposed in a hermetic container for generating a driving force, and a compression unit operated by receiving the driving force from the motor unit. The is hermetic compressors may be categorized into a reciprocating type, a rotary type, a vane type and a scroll type according to the compression mechanism with respect to a refrigerant as a compressible fluid.

The reciprocating compressor is configured such that a connecting rod is coupled to a crankshaft of the motor unit and a piston is coupled to the connecting rod, so that a rotational force of the motor unit is converted into a linear motion of the piston. The connecting rod has one end rotatably coupled to the piston and another end rotatably inserted into a pin of the crankshaft.

However, the another end of the connecting rod should be inserted into the pin of the crankshaft for assembly. Accordingly, in order to couple the pin of the crankshaft to the connecting rod, an annular connecting portion having a diameter larger than that of the pin of the crankshaft should be formed at the end of the connecting rod. Further, between an inner circumferential surface of the annular connecting portion and an outer circumferential surface of the pin, a sleeve as thick as an interval therebetween is inserted so that the rotational force of the crankshaft is transferred to the connecting rod.

DISCLOSURE

Technical Problem

However, in the related art reciprocating compressor, the sleeve was fabricated by using the same material as the connecting rod, which is sintered and alloyed, or a material having the same thermal expansion coefficient as the connecting rod, so as to be press-fitted to the connecting portion of the connecting rod, but the process of press-fitting the sleeve into the connecting rod is not easy to be performed and deformation of the sleeve may occur when press-fitting the sleeve. Accordingly, a roundness of an inner diameter of the sleeve is deteriorated, is which may cause a frictional loss to be increased between the pin of the crankshaft and the sleeve, resulting in increase in an input load of the motor unit and increase in the abrasion of the crankshaft having a relatively low hardness.

Therefore, to solve the problems of the related art reciprocating compressor, it is an object of the present invention to provide a reciprocating compressor capable of facilitating the assembly of the sleeve and preventing the deformation of the sleeve upon the assembling process of the sleeve and also of preventing the increase in the input load of the motor unit or the abrasion of the pin of the crankshaft after assembling the sleeve.

Technical Solution

To achieve the object, in accordance with one aspect of the present invention, there is provided a reciprocating compressor, including a crankshaft coupled to a rotor of a motor unit and configured to transfer a rotational force, a connecting rod coupled to the crankshaft and configured to convert a rotational force of the crankshaft into a linear motion of the piston, and a sleeve interposed between the crankshaft and connecting rod and serving as a bearing, wherein the sleeve is formed of a material different from the connecting rod, the material having a thermal expansion coefficient higher than that of the connecting rod.

In accordance with another aspect of the present invention, there is provided with a reciprocating compressor, including a crankshaft coupled to a rotor of a motor unit and configured to transfer a rotational force, a connecting rod coupled to the crankshaft and configured to convert a rotational force of the crankshaft into a linear motion of the piston, and a sleeve interposed between the crankshaft and connecting rod and serving as a bearing, wherein the sleeve comprises a bearing portion interposed between the connecting rod and the is crankshaft, the bearing portion having an outer diameter smaller than an inner diameter of the connecting rod, and a supporting portion formed at one end of the bearing portion in a flange shape and supported by the connecting rod in the shaft direction.

In accordance with another aspect of the present invention, there is provided with an anti-abrasion device wherein a bearing, disposed between a crankshaft for transferring a rotational force of a motor and a connecting rod, the connecting rod coupled to the crankshaft for converting a rotary motion into a linear motion, is formed of a material different from the connecting rod, the material having a thermal expansion coefficient higher than that of the connecting rod.

Advantageous Effect

The present invention discloses an anti-abrasion device and a reciprocating compressor having the same, whereby a sleeve is fabricated with an outer diameter smaller than an inner diameter of a connecting rod to be non-press-fitted, thereby facilitating an assembly of the sleeve, and also the deformation of an inner diameter of the sleeve is prevented during the assembly of the sleeve, thereby preventing beforehand an increase in an input load of a motor unit due to the deformation of the sleeve and an abrasion of a pin of a crankshaft.

MODE FOR INVENTION

Hereinafter, description will be given in detail of a reciprocating compressor in accordance with embodiments shown in the accompanying drawings.

Figure 1:
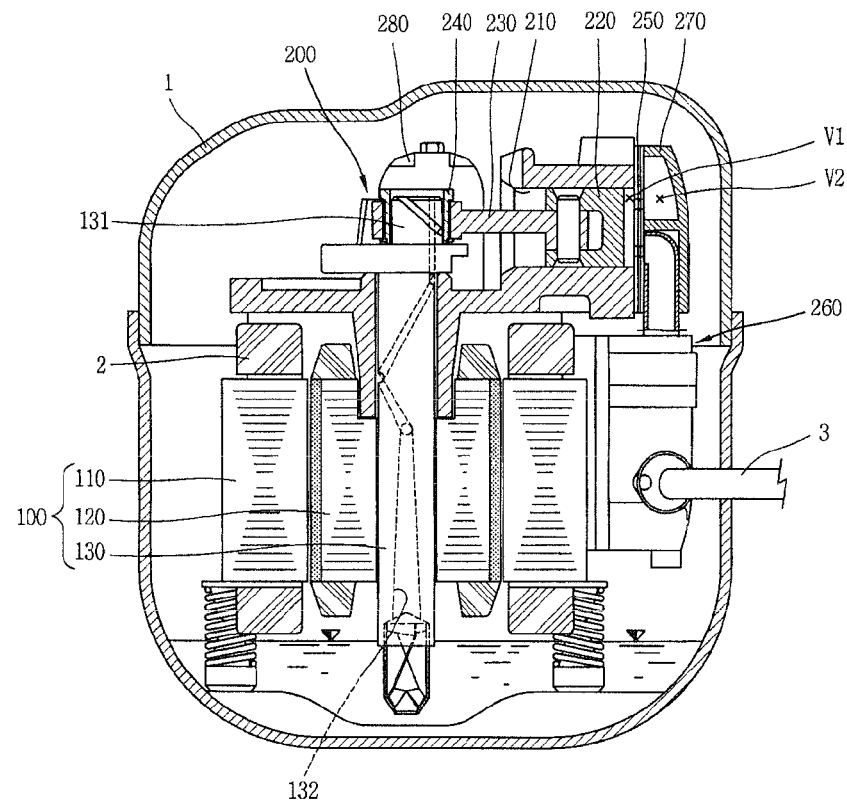
FIG. 1 is a longitudinal cross-sectional view showing one embodiment of a reciprocating compressor in accordance with the present invention.
Figure 2:
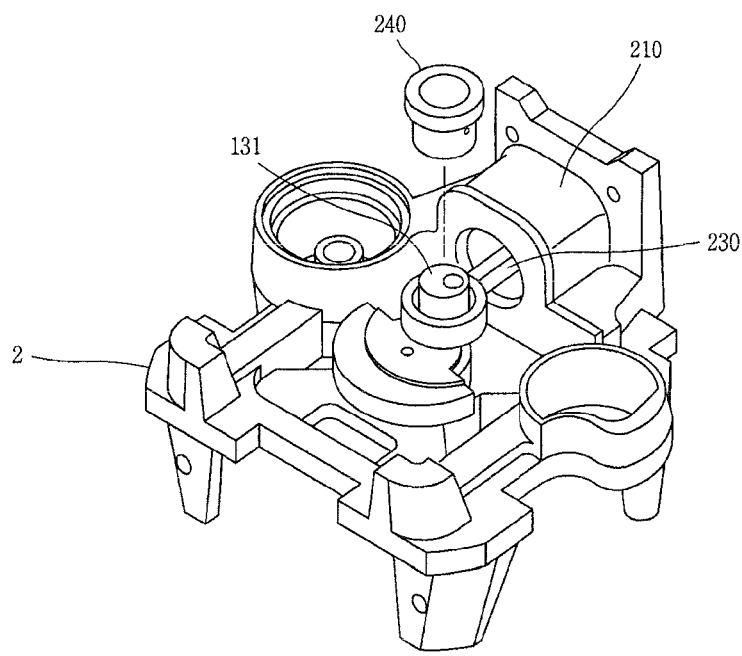
FIG. 2 is a perspective view showing a compression unit of the reciprocating compressor in accordance with FIG. 1.

As shown in FIGS. 1 and 2, the reciprocating compressor according to the present invention may include a motor unit 100 installed in a hermetic container 1 and rotated in a forward direction and a reverse direction, and a compression unit 200 installed at an upper side of the motor unit 100 for compressing a refrigerant by receiving a rotational force from the motor unit 100.

The motor unit 100 may be implemented as a constant-speed motor or an inverter motor which is rotatable in a forward direction and a reverse direction. The motor unit 100 may include a stator 110 elastically installed in the hermetic container 1 with being supported by a frame 2, a stator 120 rotatably installed inside the stator 110, and a crankshaft 130 coupled to the center of the rotor 120 for transferring a rotational force to the compression unit 200. The crankshaft 130 has an upper end having a sleeve 240 coupled thereto, which will be explained later, and includes a pin 131 eccentric from the center of shaft with a predetermined eccentric amount so that a piston 220 can be reciprocated. An oil passage 132 is formed through the crankshaft 130 in the shaft direction.

The compression unit 200 may include a cylinder 210 having a specific compression space V1 formed therein, a piston 220 for compressing a refrigerant by being reciprocated in the compression space V1 of the cylinder 210 in a radial direction, a connecting rod 230 having one end rotatably coupled to the piston 220 and another end rotatably coupled to the pin 131 of the crankshaft 130 so as to is convert the rotary motion of the motor unit 100 into a linear motion of the piston 220, a sleeve 240 inserted between the pin 131 of the crankshaft 130 and the connecting rod 230 so as to serve as a bearing, a valve assembly 250 coupled to a front end of the cylinder 210 and having a suction valve and a discharge valve, a suction muffler 260 coupled to a suction side of the valve assembly 250, a discharge cover 270 coupled so as to accommodate a discharge side of the valve assembly 250, and a discharge muffler 280 communicated with the discharge cover 270 for attenuating the discharge noise of a discharged refrigerant.

The cylinder 210 formed in a cylindrical shape is integrally formed at the frame 2 or assembled at the frame.

The piston 220 is formed in a hollow cylindrical shape having a sealed one end and coupled by a pin to a piston connecting portion 233 of the connecting rod 230, which will be explained later.

The connecting rod 230, made of a sintered alloy, may include a shaft connecting portion 231 rotatably coupled to an outer circumferential surface of the sleeve 240, a rod portion 232 extending from the shaft connecting portion 231, and a piston connecting portion 233 formed at another end of the rod portion 232 and rotatably coupled to the piston 220. The shaft connecting portion 231 and the piston connecting portion 233 may be formed in a ring shape. Considering that the shaft connecting portion 231 is assembled after the piston connecting portion 233 is assembled, an inner diameter D1 of the shaft connecting portion 231 may be formed larger than an inner diameter D2 of the piston connecting portion 233, and larger than an outer diameter D3 of the pin 131 of the crankshaft 130.

Figure 3:
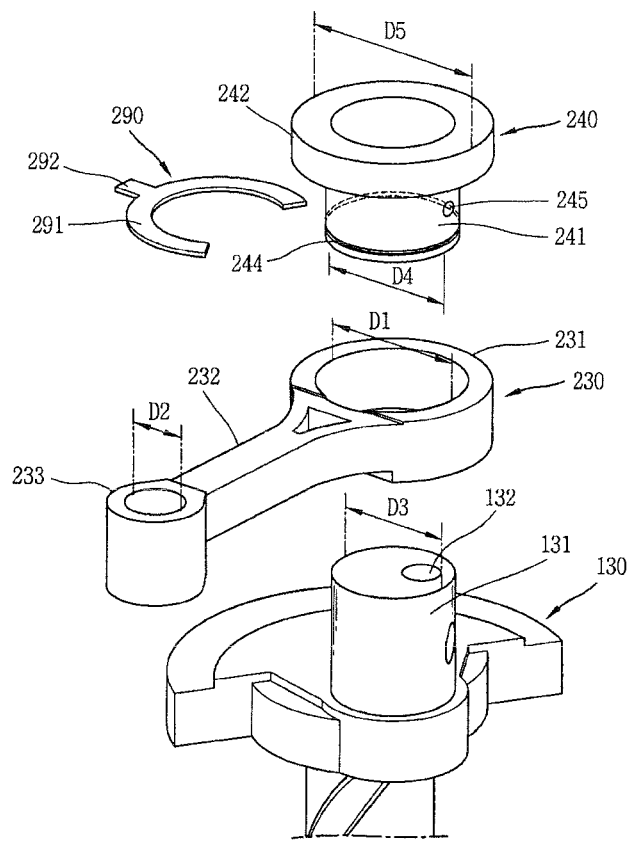
FIG. 3 is a perspective view showing an embodiment of a connecting rod, is a sleeve, and a crankshaft disassembled from the compression unit, in accordance with FIG. 2.
Figure 4:
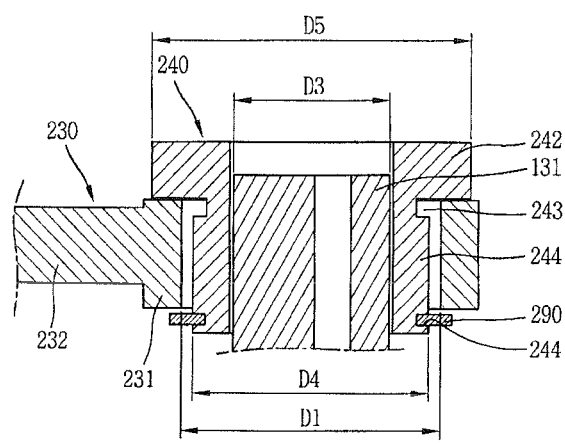
FIG. 4 is a longitudinal cross-sectional view showing the connecting rod and the sleeve both coupled to the crankshaft in the compression unit, in accordance with FIG. 3.

The sleeve 240 may be made of a material having a thermal expansion coefficient greater than that of the connecting rod 230, for example, aluminum specifically having high composition ratio of copper and silicon. The sleeve 240, as is shown in FIGS. 3 and 4, is provided with a bearing portion 242 formed in a cylindrical shape having outer and inner circumferential surfaces formed in a right circular shape and having the same thickness in the shaft direction, and a supporting portion 242 formed in a flange shape at an upper end of the bearing portion 241 so as to be supported by an upper surface of the shaft connecting portion 231 of the connecting rod 230. An edge groove 243 formed in a ring shape may be recessed at a connected portion between the bearing portion 241 and the supporting portion 242 to be deeper than the bearing portion 241 so that the connected portion is at a right angle when processing the bearing portion 241. Also, a ring inserting groove 244 in which a fixing ring 290 to be explained later is press-fitted may be formed at another end of the bearing portion 241, namely, at an opposite side of the edge groove 243 based upon the shaft connecting portion 231 of the connecting rod 230.

When the bearing portion 241 is precisely processed by a milling machine, for example, since the connected portion may be curved by the milling machine, the depth and width of the edge groove 243 may be appropriately decided by considering the size of the milling machine so as to prevent the connected portion from being curved.

The ring inserting groove 244 may be formed in a ring shape with a predetermined distance from a lower surface of the supporting portion 242, namely, a distance which is not shorter than a thickness of the shaft connecting portion 231 of the connecting rod 230. The fixing ring 290 inserted into the ring inserting groove 244 may be implemented as a snap ring having a supporting portion 291 formed in a "C"-like shape, and a handle 292 extending from a middle portion of an outer circumferential surface of the supporting portion 291 in a radial direction so that a user can easily grasp or hold with a jig.

Preferably, the bearing portion 241 has an inner diameter, which is not smaller than at least an outer diameter of the pin 131 of the crankshaft 130, more specifically, formed approximately 2 μm larger than the outer diameter D3 of the pin 131, thereby facilitating the assembly of the sleeve 240. In case where the bearing portion 241 is formed to have an outer diameter D4 shorter than at least an inner diameter D1 of the shaft connecting portion 231 of the connecting rod 230, namely, in case where the sleeve 240 is formed of a material having a thermal expansion coefficient greater than that of the connecting rod 230, when the compressor is operated, more particularly, at a temperature higher than a room temperature (typically, 25~30° C.), an interval between the sleeve 240 and the shaft connecting portion 231 of the connecting rod 230 may be approximately in the range of 0<t<25 μm so that the sleeve 240 can be closely adhered to the shaft connecting portion 231 of the connecting rod 230. In addition, at the time of initiating the compressor, the outer circumferential surface of the bearing portion 241 serves as a bearing surface with respect to the inner circumferential surface of the shaft connecting portion 231 of the connecting rod 230, accordingly it is preferable to precisely process the outer circumferential surface of the bearing portion 241. However, since the inner circumferential surface of the bearing portion 241 typically configures a bearing surface with the pin 131 of the crankshaft 130, it is preferable to precisely process the inner circumferential surface of the bearing portion 241 more than the outer circumferential surface thereof.

The bearing portion 241 may be provided with at least one oil hole 245 formed through the inner and outer circumferential surfaces thereof. The oil hole 245 allows part of the oil supplied via the oil passage 132 of the crankshaft 130 to be supplied to the outer circumferential surface of the bearing portion 241 when the bearing portion 241 of the sleeve 240 serves as a bearing before being closely adhered to the shaft connecting portion 231 of the connecting rod 130.

The supporting portion 242 of the sleeve 240 may be formed in a flange shape having an outer diameter D5 larger than the inner diameter D1 of the shaft connecting portion 231 of the connecting rod 230.

Figure 5:
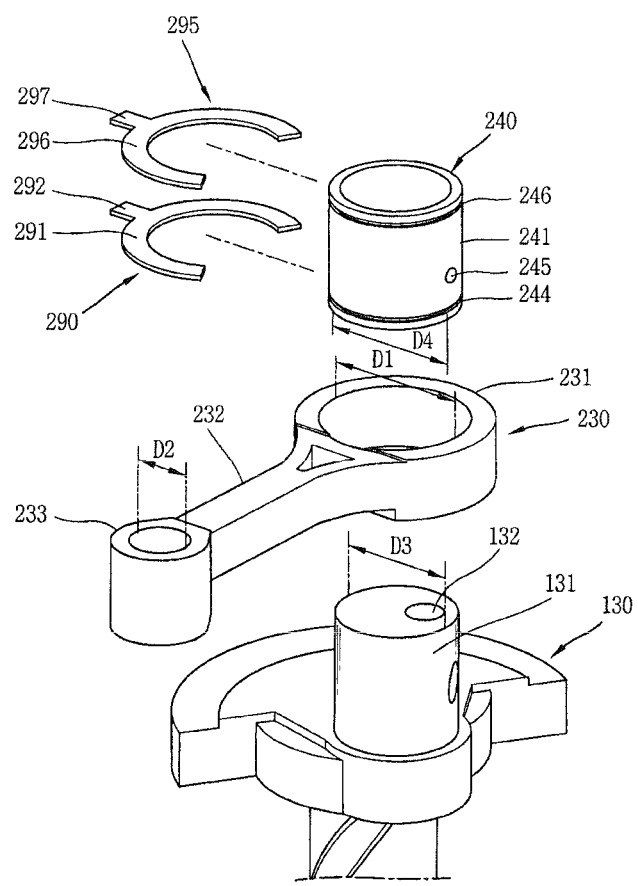
FIG. 5 is a perspective view showing another embodiment of a connecting rod, a sleeve, and a crankshaft disassembled from the compression unit, in accordance with FIG. 2.

Meanwhile, as shown in FIG. 5, the supporting portion 242 of the sleeve 240 may not be employed in some cases, and another fixing ring 295 other than the supporting portion 242 may be inserted. In this case, a ring inserting groove 246 in which the fixing ring 295 can be inserted may further be formed at an upper side of the bearing portion 241 of the sleeve 240.

In the drawing, unexplained reference numeral 3 denotes a suction pipe, 296 denotes a supporting portion, 297 denotes a handle, and V2 denotes a discharge space.

The reciprocating compressor according to the present invention will be assembled as follows.

First, the piston 230 is rotatably coupled to the bearing side connecting portion 233 of the connecting rod 230 by a separate connecting pin (no reference numeral given). The piston 220 coupled to the connecting rod 230 is then inserted into the compression space V1 of the cylinder 210.

Next, the crankshaft side connecting portion 231 of the connecting rod 230 is rotatably inserted into the pin 131 of the crankshaft 130. Here, the shaft connecting portion 231 should be inserted into the pin 131 with being rotated based upon the connection point between the connecting rod 230 and the piston 220, and accordingly the inner diameter of the shaft connecting portion 231 is formed to be considerably larger than the outer diameter of the pin 131. Therefore, since a large gap may be generated between the inner diameter of the shaft connecting portion 231 and the outer diameter of the pin 131 after the shaft connecting portion 231 is inserted, such gap is accordingly filled by inserting the sleeve 240 therein.

Here, if the outer diameter D4 of the sleeve 240 is nearly similar to the inner diameter D1 of the shaft connecting portion 231 of the connecting rod 230, the sleeve 240 should be press-fitted into the connecting rod 230. Accordingly, in this process, the sleeve 240 may be deformed due to being press-fitted. However, in the present invention, as the outer diameter D4 of the sleeve 240 is formed smaller than the inner diameter D1 of the shaft connecting portion 231 of the connecting rod 230, namely, they are spaced from each other in the range of 0<t<25 μm as aforementioned. Hence, the insertion of the sleeve 240 may be facilitated, and the deformation of the sleeve 240 may be avoided from being occurred even during the insertion of the sleeve 240.

In the meantime, the reciprocating compressor according to the present invention will be operated as follows.

That is, when power is applied to the stator 110 of the motor unit 110, the rotor 120 is rotated together with the crankshaft 130 by the interaction with the stator 110. The connecting rod 230, coupled to the pin 131 of the crankshaft 130 with the sleeve 240 interposed therebetween, is orbited, accordingly the piston 220 connected to the connecting rod 230 is linearly reciprocated within the compression space V1 of the cylinder 210, thereby compressing a refrigerant. Such series of processes are repeatedly performed.

Here, the sleeve 240 may perform a relative motion with being spaced from the connecting rod 230 or serve as a bearing with respect to the pin 131 of the crankshaft 130 with being closely adhered thereto, depending on an operation mode of the compressor.

Figure 6:
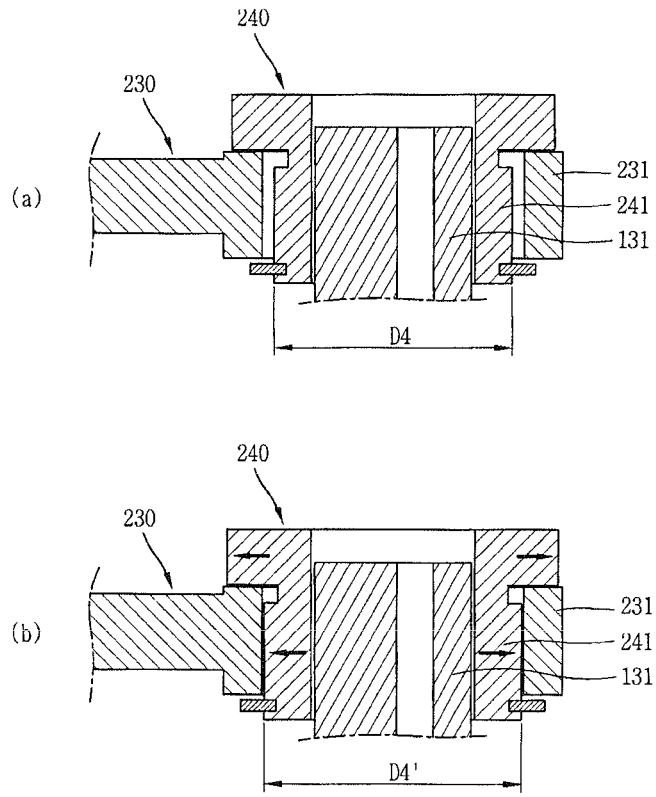
FIG. 6 is a schematic view showing the transformation of the sleeve according to an operation mode of the compressor, in the compression unit in accordance with FIG. 2.

For example, at a room temperature, such as the time of assembling or initiating the compressor, as shown in FIG. 6(a), a relative temperature of the sleeve 240 is low, accordingly a constant interval is maintained between the sleeve 240 and the connecting rod 230 without a great transformation (change) of not only the connecting rod 230 but also the sleeve 240 having relatively high thermal expansion coefficient. Accordingly, the sleeve 240 performs a rotary motion with respect to the connecting rod 230 in cooperation with the orbit motion of the pin 131 of the crankshaft 130.

However, after the compressor is continuously operated for a predetermined time, namely, at a temperature higher than a room temperature, the relative temperature of the sleeve 240 is risen, and accordingly the sleeve 240 is thermally expanded, as shown in FIG. 6(b), thereby increasing the outer diameter D4' of the bearing portion 241. Accordingly, the interval between the sleeve 240 and the connecting rod 230 becomes narrower so that the bearing portion 241 of the sleeve 240 is closely adhered to the shaft connecting portion 231 of the connecting rod 230. The inner circumferential surface of the sleeve 240 may form a bearing surface with the pin 131 of the crankshaft 130.

Figure 7:
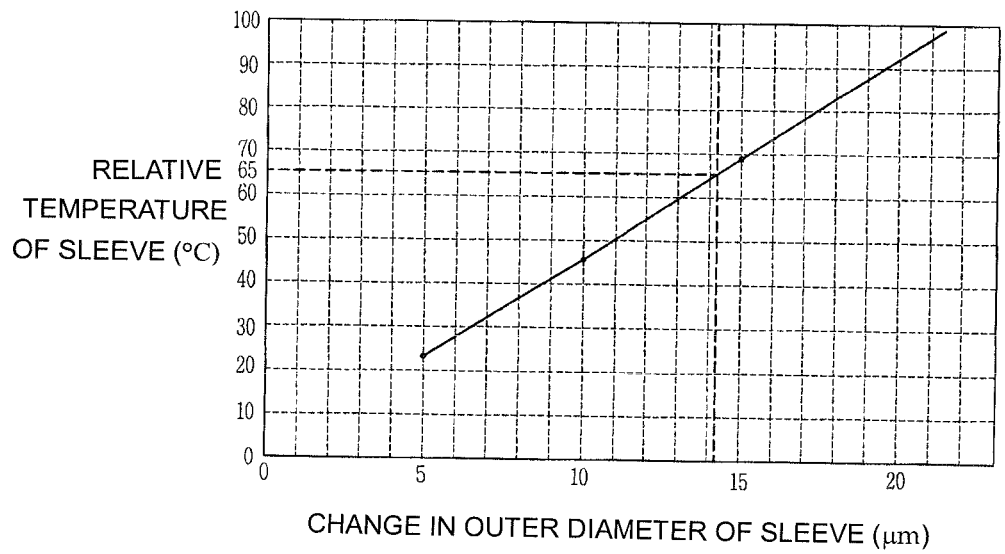
FIG. 7 is a graph showing the changes in an outer diameter of the sleeve according to the variation of temperature thereof in the reciprocating compressor in accordance with FIG. 1.

FIG. 7 is a graph showing the changes in the outer diameter of the sleeve 240 according to the variation of temperature. As shown in FIG. 7, under the room temperature condition, such as in a stopped state or initial mode of the compressor, the relative temperature of the sleeve 240 (the change in the temperature of the sleeve from the room temperature) is maintained at approximately 0° C., and accordingly the outer diameter D4 of the sleeve 240 is rarely changed. However, if the operation of the compressor is continued for a predetermined time after being initiated, the relative temperature of the sleeve 240 is risen. So, if the relative temperature is risen up to approximately 25° C., the outer is diameter D4 of the sleeve 240 is increased up to approximately 5 μm. If the compressor is normally operated, the temperature of the compressor is risen up to approximately 90° C., and accordingly the relative temperature of the sleeve 240 is risen up to 65° C., thereby increasing the outer diameter D4 of the sleeve 240 by approximately 14 μm. Also, the change in the outer diameter of the sleeve 240 may depend on the operation conditions of the compressor, for example, a type of refrigerant or oil, whether a suction pressure is generated within a casing or a discharge pressure is generated therein and the like. However, an inner temperature of the compressor is not risen higher than approximately 130° C. Hence, under the condition that the inner temperature of the compressor is 130° C., namely, when the relative temperature of the sleeve 240 is risen up to about 100° C., the outer diameter of the sleeve 240 is increased by approximately 25 μm. Therefore, it can be noticed that an appropriate interval between the sleeve 240 and the connecting rod 230 is preferably in the range of 0<t<25 μm as aforementioned.

Figure 8:
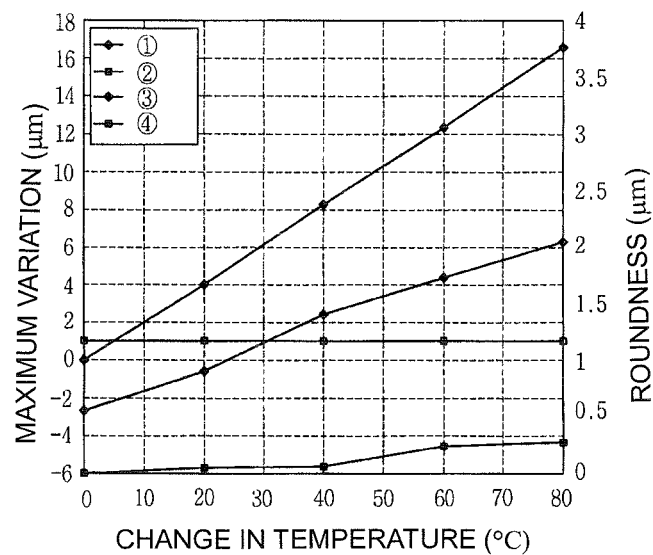
FIG. 8 is a graph showing comparison results of the changes in outer and inner diameters of the sleeve according to the variation of the temperature thereof, respectively in case of press-fitting a sleeve fabricated with a sintered alloy and in case of non-press-fitting a sleeve fabricated with aluminum, in the reciprocating compressor in accordance with FIG. 1.

Consequently, the sleeve 240 can be prevented from being deformed due to the connecting rod 230 while assembling the sleeve 240. FIG. 8 is a graph showing comparison results of the changes in outer and inner diameters of the sleeve according to the variation of the temperature thereof, respectively in case of press-fitting a sleeve fabricated with a sintered alloy and in case of non-press-fitting a sleeve fabricated with aluminum.

As shown in the graph, it can be known that when the sleeve made of the sintered alloy is press-fitted, an outer diameter (line ①) is slightly changed according to the variation of the temperature while an inner diameter (line ②) is rarely changed. Specifically, it has been noticed that even a minus change in the outer diameter was shown in the range of temperature of 0~20° C., which indicates is that the outer diameter is changed by being pressed by the shaft connecting portion 231 of the connecting rod 230 when press-fitting the sleeve 240.

On the contrary, when an aluminum sleeve is non-press-fitted, it can be known that the outer diameter (line ③) is greatly changed and simultaneously the inner diameter (line ④) is also slightly changed at a temperature higher than a particular temperature (approximately 40° C.). Specifically, the maximum variation ratio of the outer diameter of the sleeve 240 was zero at the temperature of 0° C., which indicates that the outer diameter of the sleeve 240 was not deformed at all by the shaft connecting portion 231 of the connecting rod 230 owing to the non-press-fitting. Here, it can be noticed that when the sleeve 240 is non-press-fitted, the temperature is risen so as to increase the inner diameter of the sleeve 240, but the change in the roundness becomes nearly zero and accordingly the facial pressure with the crankshaft 130 is decreased, thereby relatively reducing abrasion.

Hereinafter, description will be given of another embodiment of an anti-abrasion device and a reciprocating compressor having the same according to the present invention.

That is, the previous embodiment illustrated that the sleeve is fabricated to have the outer diameter smaller than the inner diameter of the shaft connecting portion of the connecting rod and thereafter the sleeve is thermally expanded, thereby being closely adhered to the connecting rod responsive to the rise of temperature during the operation of the compressor. This embodiment is the same to the previous embodiment in that the outer diameter of the sleeve is fabricated smaller than the inner diameter of the connecting rod so as to facilitate the assembly therebetween. However, this embodiment is different from the previous embodiment in that the sleeve is not allowed to be closely adhered to the connecting rod in spite of the rise of the temperature. To this end, a sleeve locking unit disposed between the connecting rod and the sleeve for restricting a relative motion of the sleeve may further be provided in this embodiment, which is also different from the previous embodiment.

Figure 9:
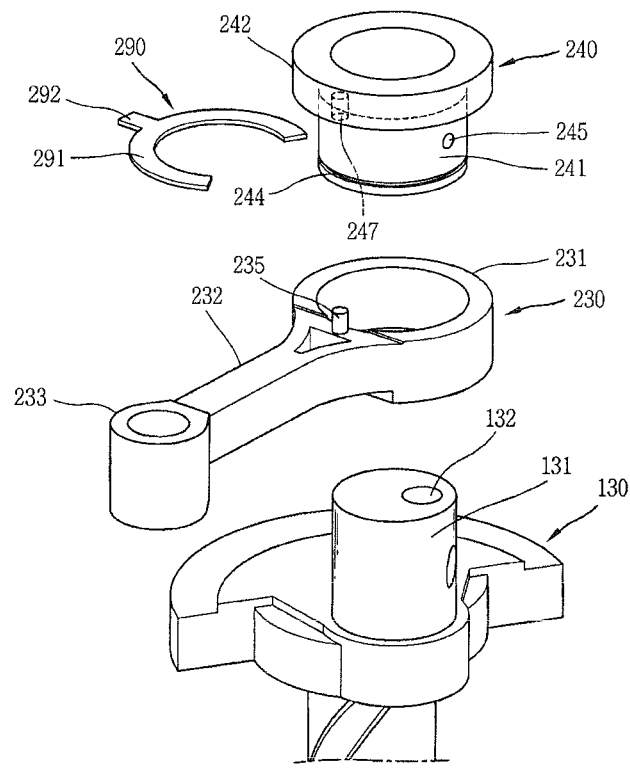
FIGS. 9 and 10 are a disassembled perspective view and an assembled perspective view showing an assembled structure of the connecting rod, the sleeve and the crankshaft in the reciprocating compressor in accordance with FIG. 1.
Figure 10:
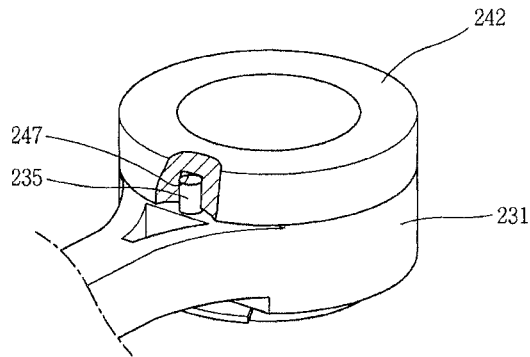

For example, as shown in FIGS. 9 and 10, in a reciprocating compressor in accordance with this embodiment of the present invention, a locking protrusion 235 is formed at an upper surface of the shaft connecting portion 231 of the connecting rod 230 in the shaft direction, and a locking hole 247, in which the locking protrusion 235 of the connecting rod 230 is inserted so as to lock the sleeve 240 in a circumferential direction, is formed at the supporting portion 242 of the sleeve 240.

The locking hole 247 may be formed to be almost closely adhered to the locking protrusion 235 when the sleeve 240 is made of the same material as the connecting rod 230. However, if the sleeve 240 is made of a material with a high thermal expansion coefficient, different from a material forming the connecting rod 230, the locking hole 247 may be formed in a large right circular shape larger than the diameter of the locking protrusion 235 or long in a radial direction, by considering that the sleeve 240 is thermally transformed in its radial direction.

Here, the locking protrusion 235 and the locking hole (or locking groove) 247 may be formed in a radial direction. The basic configuration and operation effects according to this embodiment are similar to the previous embodiment, thus a detailed description thereof will be omitted.

Hereinafter, description will be given of still another embodiment of an anti-abrasion device and a reciprocating compressor having the same according to the present invention.

That is, the previous embodiments have illustrated that the sleeve 240 is formed of a material different from the connecting rod 230; however, this embodiment illustrates that the sleeve 240 and the connecting rod 230 are formed of the same material.

Even in this case, the outer diameter D4 of the bearing portion 241 of the sleeve 240 is formed smaller than the inner diameter D1 of the shaft connecting portion 231 of the connecting rod 230 within the aforementioned range so as to prevent in advance the bearing portion 241 of the sleeve 240 from being deformed due to the press-fitting during the assembly of the sleeve 240.

Figure 11:
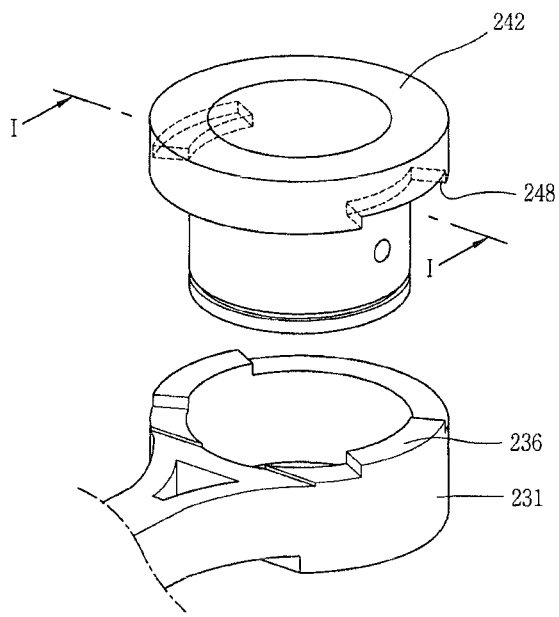
FIGS. 11 and 12 are an assembled perspective view showing another embodiment of the assembled structure of the connecting rod, the sleeve and the crankshaft in the reciprocating compressor in accordance with FIG. 9, and a cross-sectional view taken along the line I-I of FIG. 11.
Figure 12:
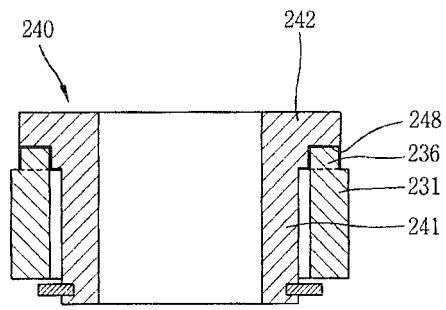

However, in this embodiment, a frictional loss may occur while the sleeve 240 is rotated with respect to the connecting rod 230. To lock the sleeve 240 and the connecting rod 230 to each other, locking protrusions 236 and locking grooves 248 may be formed at the shaft connecting portion 231 of the connecting rod 230 and the supporting portion 242 of the sleeve 240. The locking protrusions 236 and the locking grooves 248 should have a hardness as great as the sleeve 240 smoothly transferring the rotational force of the crankshaft 130 to the connecting rod 230. Accordingly, as shown in FIGS. 11 and 12, the locking protrusions 236 and the locking grooves 248 may respectively be formed with a predetermined interval by about 90° in the circumferential direction of the shaft connecting portion 231 of the connecting rod 230. Here, the angle of the circumference of the respective locking protrusion 236 and locking groove 248 may not be limited to 90° but it may be appropriate if the angle of the circumference is as great as being capable of transferring the rotational force so as to operate the compressor. Further, the drawing shows the example that the locking protrusion is formed at the connecting rod and the locking groove is formed at the sleeve; however, the locking protrusion and the locking groove may be disposed vice versa. Alternatively, the locking protrusion 236 and the locking groove 248 may is alternately be formed so as to be engaged with the sleeve and the connecting rod, respectively, in a gear shape.

The basic configuration and operation effects according to this embodiment are similar to the previous embodiment, thus a detailed description thereof will be omitted.

INDUSTRIAL AVAILABILITY

The present invention has described as being applied to a single type reciprocating compressor having one cylinder, but, in some cases, may be applicable to a multi-type reciprocating compressor having a plurality of cylinders. Also, the present invention has been applied to the sleeve interposed between the crankshaft and the connecting rod of the reciprocating compressor; however, besides the example, it may widely be applied to the field employing a bush bearing.

The invention claimed is:

1. A reciprocating compressor comprising:
a crankshaft coupled to a rotor of a motor unit and configured to transfer a rotational force;
a connecting rod coupled to the crankshaft and configured to convert a rotational force of the crankshaft into a linear motion of the piston; and
a sleeve interposed between the crankshaft and connecting rod and configured to serve as a bearing,
wherein the connecting rod is provided with a connecting portion formed at one side thereof in an annular shape in which the sleeve is inserted, and the sleeve has an outer diameter smaller than an inner diameter of the connecting portion of the connecting rod at a room temperature,
wherein the sleeve is provided with a shaft-directional supporting element configured to support the sleeve with respect to the connecting portion of the connecting rod in the shaft direction, and
wherein the shaft-directional supporting element is a supporting portion integrally formed with the sleeve, the supporting portion having an outer diameter larger than the inner diameter of the connecting portion of the connecting rod.

2. The compressor of claim 1, wherein the sleeve is formed of a material different from the connecting rod, the material having a thermal expansion coefficient higher than that of the connecting rod.

3. The compressor of claim 2, wherein a difference t between the inner diameter of the connecting portion of the connecting rod and the outer diameter of the sleeve is approximately in the range of 0<t<25 μm.

4. The compressor of claim 2, wherein the sleeve is provided with at least one or more oil holes formed through inner and outer circumferential surfaces thereof.

5. The compressor of claim 2, wherein the sleeve is formed so that the outer diameter thereof is contactable with an inner circumferential surface of the connecting portion of the connecting rod at a temperature higher than the room temperature.

6. The compressor of claim 1, wherein the sleeve is formed of aluminum.

7. A reciprocating compressor comprising:
a crankshaft coupled to a rotor of a motor unit and configured to transfer a rotational force;
a connecting rod coupled to the crankshaft and configured to convert a rotational force of the crankshaft into a linear motion of the piston; and
a sleeve interposed between the crankshaft and connecting rod and configured to serve as a bearing,
wherein the connecting rod is provided with a connecting portion formed at one side thereof in an annular shape in which the sleeve is inserted, and the sleeve has an outer diameter smaller than an inner diameter of the connecting portion of the connecting rod at a room temperature, and
wherein the sleeve comprises a bearing portion interposed between the connecting rod and the crankshaft, the bearing portion having an outer diameter smaller than an inner diameter of the connecting rod, and a supporting portion formed at one end of the bearing portion in a flange shape and supported by the connecting rod in the shaft direction.

8. The compressor of claim 7, wherein at the connected portion between the bearing portion and the supporting portion is provided a groove formed in a ring shape to be deeper than the outer diameter of the bearing portion along a circumferential direction.

9. The compressor of claim 8, wherein an inner circumferential surface of the bearing portion is processed more precisely than an outer circumferential surface thereof.

10. The compressor of claim 7, further comprising a groove formed in a ring shape at an opposite side of the supporting portion based upon the connecting rod so that a fixing ring is coupled thereinto.

11. The compressor of claim 7, further comprising a sleeve locking unit disposed between the connecting rod and the sleeve and configured to lock a sliding motion therebetween.

12. The compressor of claim 11, wherein a protrusion is formed at one of the connecting rod and the sleeve, whereas a recess or hole in which the protrusion is inserted to be locked in the circumferential direction is formed at another one.

13. The compressor of claim 12, wherein the recess or hole is formed to be larger than an outer diameter of the protrusion or long in a radial direction so that the protrusion is movable in the radial direction.

14. The compressor of claim 13, wherein the sleeve is formed of a material different from the connecting rod, the material having a thermal expansion coefficient higher than that of the connecting rod.

15. The compressor of claim 12, wherein the sleeve is formed of a material having the same thermal expansion coefficient as that of the connecting rod.

16. An anti-abrasion device wherein a bearing, disposed between a crankshaft for transferring a rotational force of a motor and a connecting rod, coupled to the crankshaft for converting a rotary motion into a linear motion, is formed of a material different from the connecting rod, the material having a thermal expansion coefficient higher than that of the connecting rod, and wherein the bearing comprises a bearing portion interposed between the connecting rod and the crankshaft, the bearing portion having an outer diameter smaller than an inner diameter of the connecting rod, and a supporting portion formed at one end of the bearing portion in a flange shape and supported by the connecting rod in the shaft direction.

17. The device of claim 16, wherein an outer circumferential surface of the bearing is spaced from an inner circumferential surface of the connecting rod at a room temperature, whereas being closely adhered to the inner circumferential surface of the connecting rod at a temperature higher than the room temperature.

* * * * *